United States Patent
Stoyanov et al.

(10) Patent No.: US 8,793,384 B2
(45) Date of Patent: Jul. 29, 2014

(54) RECOVERY OF DISCONNECTED CHANNELS OVER A RELIABLE PROTOCOL

(75) Inventors: Vladimir K. Stoyanov, Redmond, WA (US); Kan Qiu, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 959 days.

(21) Appl. No.: 12/197,062

(22) Filed: Aug. 22, 2008

(65) Prior Publication Data
US 2010/0049785 A1 Feb. 25, 2010

(51) Int. Cl.
G06F 15/16 (2006.01)

(52) U.S. Cl.
USPC ............ 709/227; 709/203; 709/217; 709/219

(58) Field of Classification Search
CPC .... H04L 1/1607; H04L 43/0811; H04L 43/08
USPC .................. 709/203, 217, 219, 227
See application file for complete search history.

(56) References Cited

U.S. PATENT DOCUMENTS

| | | | |
|---|---|---|---|
| 5,754,752 A * | 5/1998 | Sheh et al. ........................ | 714/4 |
| 5,963,551 A | 10/1999 | Minko ........................... | 370/356 |
| 6,006,331 A * | 12/1999 | Chu et al. ........................ | 726/5 |
| 6,069,886 A | 5/2000 | Ayerst et al. .................... | 370/336 |
| 6,161,123 A * | 12/2000 | Renouard et al. ............. | 709/203 |
| 6,260,123 B1 * | 7/2001 | Strongin et al. .............. | 711/158 |
| 6,532,088 B1 | 3/2003 | Dantu et al. .................... | 398/43 |
| 6,611,521 B1 | 8/2003 | McKay et al. ................. | 370/392 |
| 6,785,768 B2 | 8/2004 | Peters et al. .................... | 711/112 |
| 7,133,947 B2 | 11/2006 | Tomitsuka et al. ........... | 710/106 |
| 7,143,131 B1 | 11/2006 | Soles et al. .................... | 709/203 |
| 7,647,422 B2 * | 1/2010 | Singh et al. .................... | 709/238 |
| 2002/0065064 A1 * | 5/2002 | Griffith et al. ................ | 455/405 |
| 2003/0061333 A1 | 3/2003 | Dean et al. .................... | 709/223 |
| 2003/0231598 A1 | 12/2003 | Venkataraman et al. ...... | 370/252 |
| 2005/0086342 A1 * | 4/2005 | Burt et al. ..................... | 709/224 |
| 2005/0111441 A1 | 5/2005 | Koskelainen ................. | 370/352 |
| 2006/0282512 A1 * | 12/2006 | Saint-Hilaire et al. ........ | 709/217 |
| 2006/0282514 A1 * | 12/2006 | Saint-Hilaire et al. ........ | 709/218 |
| 2008/0229017 A1 * | 9/2008 | Plamondon .................... | 711/118 |

OTHER PUBLICATIONS

Karl et al., "A Data Aggregation Framework for Wireless Sensor Networks," http://www.tkn.tu-berlin.de/publications/papers/prorise.pdf, 2003, 1-4.

Lau et al., "Multicast Medium Access Control in Wireless AD Hoc Network," http://ieeexplore.ieee.org/iel5/9178/2911/01311844.pdf, 2004, 1903-1908.

* cited by examiner

*Primary Examiner* — Phuoc Nguyen
(74) *Attorney, Agent, or Firm* — Jim Sfekas; Kate Drakos; Micky Minhas

(57) ABSTRACT

Example embodiments of the present disclosure provide techniques for recovering from a channel failure at the protocol layer. At least a portion of data that is sent from a source to a target across the channel can be stored in a communication protocol layer buffer. In the event that the channel fails and is reestablished the target can send a signal indicating how much data it actually received. The signal can be used by the source to determine which portion of the data in the buffer was lost en route to the target and the lost portion can be resent.

19 Claims, 11 Drawing Sheets

US 8,793,384 B2

RECOVERY OF DISCONNECTED CHANNELS OVER A RELIABLE PROTOCOL

BACKGROUND

It is a common scenario for a client and server to lose connectivity in the middle of a connection because WiFi coverage is lost or an Ethernet cable is accidentally disconnected. Usually this results in an automatic disconnect and the client has to reconnect to the server. In certain situations the reconnection process is an expensive operation; especially in a terminal server environment that relies on lengthy initialization processes in order to properly configure various server and client components. Techniques that reduce the overhead associated with the initialization process are desired.

SUMMARY

An example embodiment of the present disclosure describes a method. In this example, the method includes, but is not limited to sending data to a client; storing at least a portion of the sent data in a buffer; determining that a connection to the client failed; reestablishing a connection to the client; receiving a signal from the client identifying an amount of data that was successfully received by the client; determining that the client failed to receive a specific portion of the data stored in the buffer based on the signal received from the client; and sending the specific portion of the data stored in the buffer to the client. In addition to the foregoing, other aspects are described in the claims, drawings, and text forming a part of the present disclosure.

An example embodiment of the present disclosure describes a method. In this example, the method includes, but is not limited to storing a copy of data sent to a client in a buffer of a data transfer protocol; receiving a signal from the client identifying an amount of data that was received by the client; and sending a specific portion of the data stored in the buffer to the client, wherein the specific portion of the data was selected based on the signal received from the client. In addition to the foregoing, other aspects are described in the claims, drawings, and text forming a part of the present disclosure.

An example embodiment of the present disclosure describes a method. In this example, the method includes, but is not limited to sending information identifying an amount of data received from a terminal server prior to a failure of a communication channel; and receiving resent data from the terminal server, the resent data was selected from a terminal server layer buffer based on the information identifying the amount of the received data. In addition to the foregoing, other aspects are described in the claims, drawings, and text forming a part of the present disclosure.

It can be appreciated by one of skill in the art that one or more various aspects of the disclosure may include but are not limited to circuitry and/or programming for effecting the herein-referenced aspects of the present disclosure; the circuitry and/or programming can be virtually any combination of hardware, software, and/or firmware configured to effect the herein-referenced aspects depending upon the design choices of the system designer.

The foregoing is a summary and thus contains, by necessity, simplifications, generalizations and omissions of detail. Those skilled in the art will appreciate that the summary is illustrative only and is not intended to be in any way limiting.

DETAILED DESCRIPTION

Figure 1:
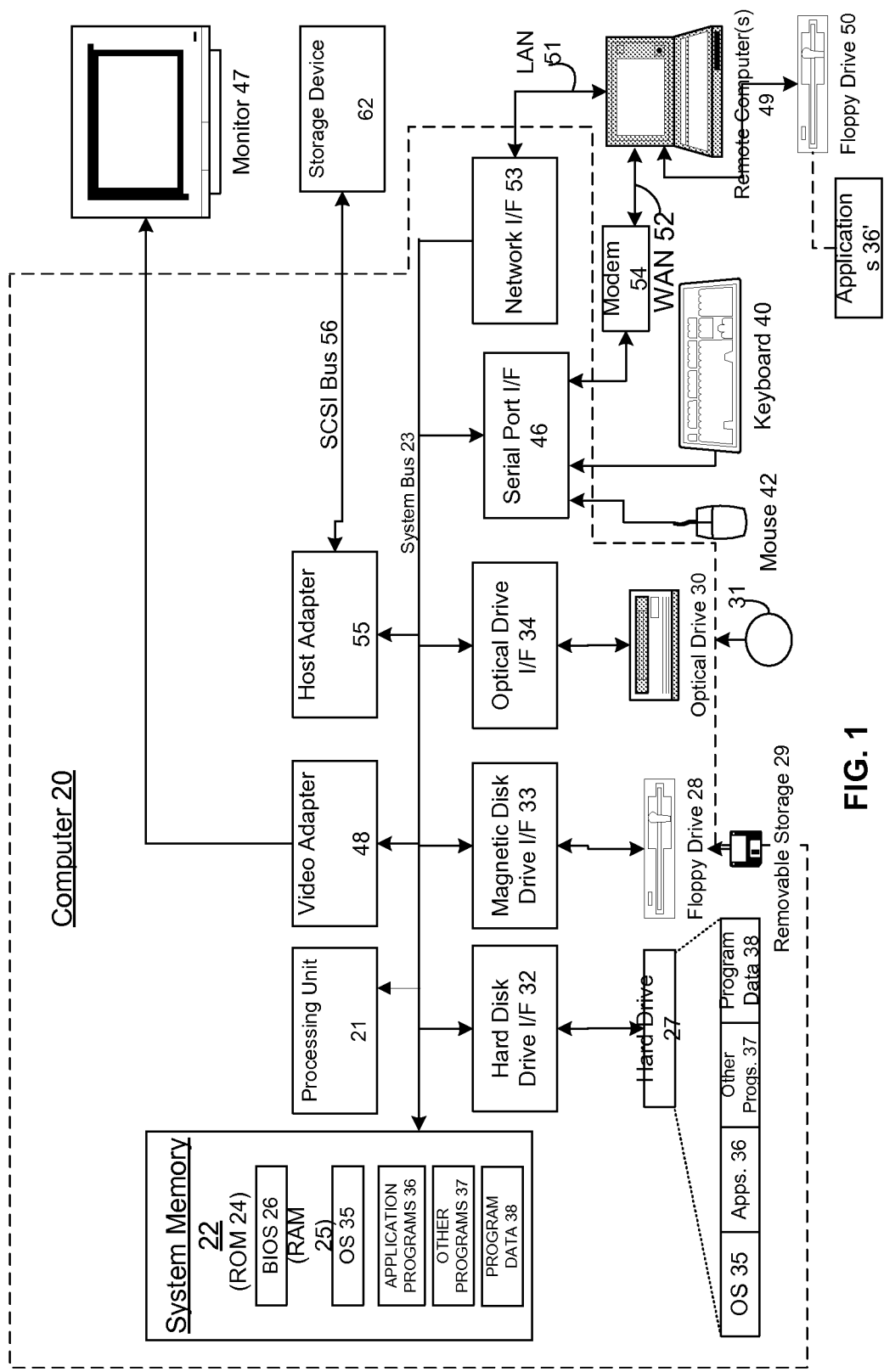
FIG. 1 depicts an example computer system wherein aspects of the present disclosure can be implemented.

Embodiments of the present disclosure may execute on one or more computers. FIG. 1 and the following discussion is intended to provide a brief general description of a suitable computing environment in which the disclosure may be implemented. One skilled in the art can appreciate that the computer system of FIG. 1 can in some embodiments effectuate the server 204 and client 201 of FIG. 2. In these example embodiments, the server 204 and client 201 can include some or all of the components described in FIG. 1 and circuitry configured to instantiate specific aspects of the present disclosure.

The term circuitry used through the disclosure can include specialized hardware components such as hardware interrupt controllers, graphics processors, and audio codecs for example. In the same or other embodiments circuitry can include microprocessors configured to perform function(s) by firmware or by setting one or more switches. In the same or other example embodiments circuitry can include one or more general purpose processing units and/or multi-core processing units that can be configured when software instructions that embody logic operable to perform function(s) are loaded from memory, e.g., RAM and/or virtual memory and are executed by the processing unit(s). In example embodiments where circuitry includes a combination of hardware and software an implementer may write source code embodying logic that is subsequently compiled into machine readable code that can be processed by the general purpose processing unit(s). Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

Referring now to FIG. 1, an exemplary general purpose computing system is depicted. The general purpose computing system can include a conventional computer 20 or the like, including a general purpose processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the computer 20, such as during start up, is stored in ROM 24. The computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. In some example embodiments computer executable instructions embodying aspects of the present disclosure may be stored in ROM 24, hard disk (not shown), RAM 25, removable magnetic disk 29, optical disk 31, and/or a cache of general purpose processing unit 21. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer readable media provide non volatile storage of computer readable instructions, data structures, program modules and other data for the computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs) and the like may also be used in the exemplary operating environment.

A number of program modules may be stored on the hard disk, magnetic disk 29, optical disk 31, ROM 24 or RAM 25, including an operating system 35, one or more application programs 36, other program modules 37 and program data 38. A user may enter commands and information into the computer 20 through input devices such as a keyboard 40 and pointing device 42. Other input devices (not shown) may include a microphone, joystick, game pad, satellite disk, scanner or the like. These and other input devices are often connected to the general purpose processing unit 21 through a serial port interface 46 that is coupled to the system bus, but may be connected by other interfaces, such as a parallel port, game port or universal serial bus (USB). A display 47 or other type of display device can also be connected to the system bus 23 via an interface, such as a video adapter 48. In addition to the display 47, computers typically include other peripheral output devices (not shown), such as speakers and printers. The exemplary system of FIG. 1 also includes a host adapter 55, Small Computer System Interface (SCSI) bus 56, and an external storage device 62 connected to the SCSI bus 56.

The computer 20 may operate in a networked environment using logical connections to one or more remote computers, such as a remote computer 49. The remote computer 49 may be another computer, a server, a router, a network PC, a peer device or other common network node, and typically can include many or all of the elements described above relative to the computer 20, although only a memory storage device 50 has been illustrated in FIG. 1. The logical connections depicted in FIG. 1 can include a local area network (LAN) 51 and a wide area network (WAN) 52. Such networking environments are commonplace in offices, enterprise wide computer networks, intranets and the Internet.

When used in a LAN networking environment, the computer 20 can be connected to the LAN 51 through a network interface or adapter 53. When used in a WAN networking environment, the computer 20 can typically include a modem 54 or other means for establishing communications over the wide area network 52, such as the Internet. The modem 54, which may be internal or external, can be connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used. Moreover, while it is envisioned that numerous embodiments of the present disclosure are particularly well-suited for computerized systems, nothing in this document is intended to limit the disclosure to such embodiments.

Figure 2:
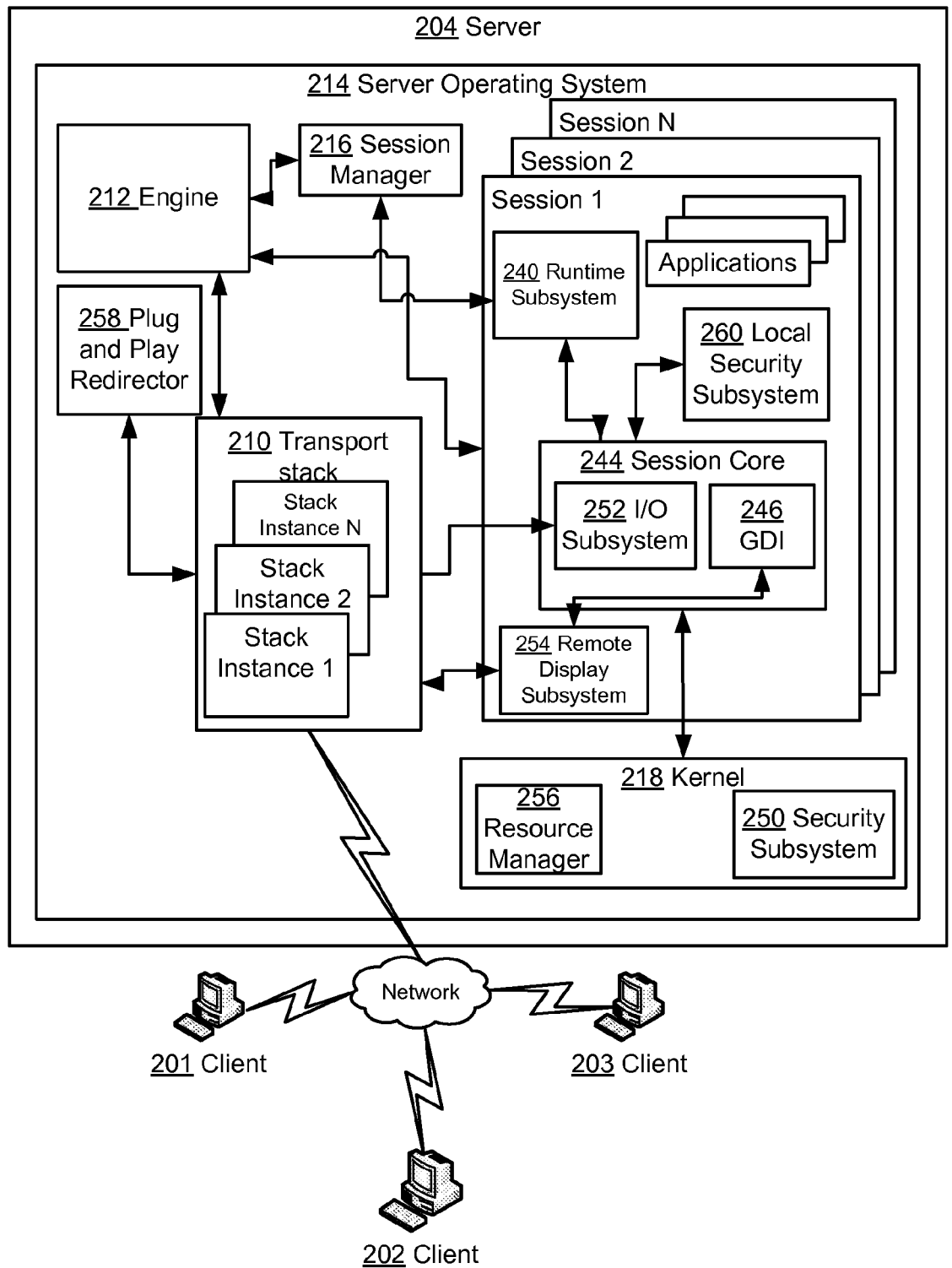
FIG. 2 depicts an operational environment for practicing aspects of the present disclosure.
Figure 3:
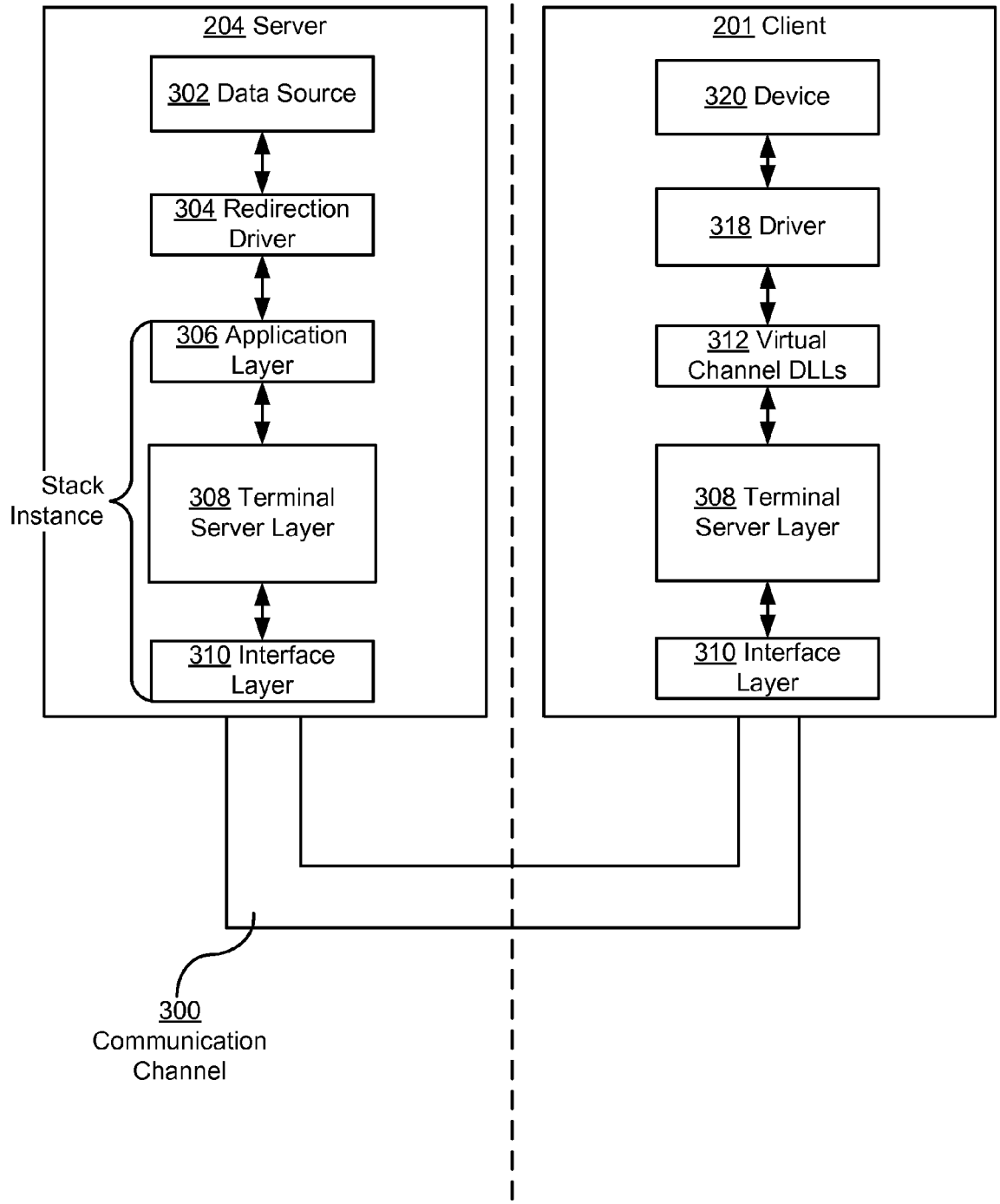
FIG. 3 depicts an operational environment for practicing aspects of the present disclosure.
Figure 4:
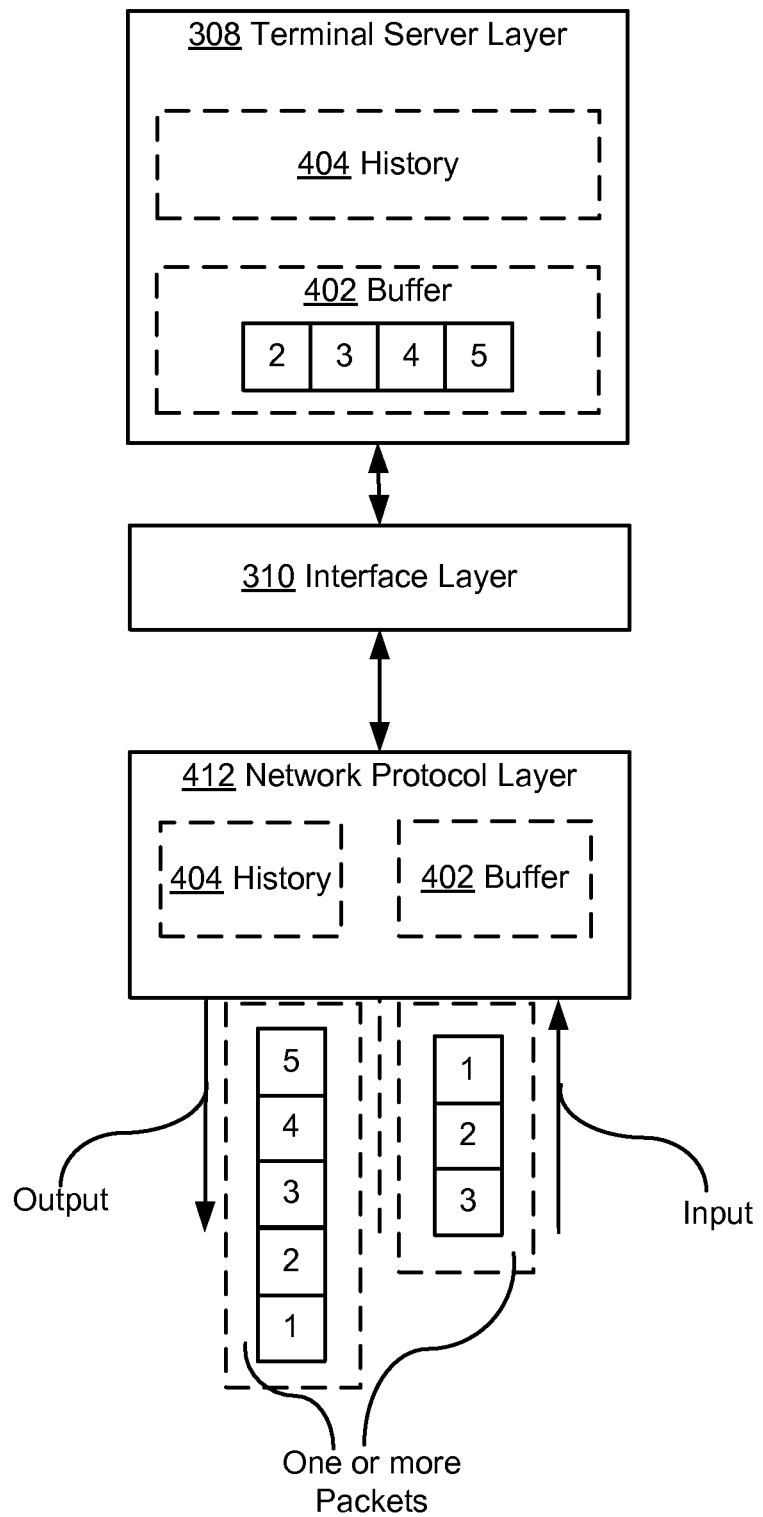
FIG. 4 illustrates a stack instance sending and receiving data streams.

Referring now to FIG. 2, it generally illustrates an example environment wherein aspects of the present disclosure can be implemented. One skilled in the art can appreciate that the example elements depicted by FIG. 2 are provided to illustrate an operational framework for describing the present disclosure. Accordingly, in some embodiments the physical layout of the environment may be different depending on different implementation schemes. Thus the example operational framework is to be treated as illustrative only and in no way limit the scope of the claims. One skilled in the art can also appreciate that the following discussion is introductory and the elements depicted by FIG. 2-FIG. 4 are described in more detail within the discussion of the operational procedures of FIG. 5-FIG. 11.

Generally, FIG. 2 depicts a high level overview of a terminal server environment that can be used in aspects of the present disclosure. In reference to the figure, a terminal server 204 is depicted that can include circuitry configured to effectuate terminal services and three example clients 201, 202, and 203 (while three clients are depicted the server 204 can service more or less clients). The example clients 201-203 can include computer terminals effectuated by hardware configured to direct user input to the server 204 and display user interface information generated by the server 204. In other embodiments, clients 201-203 can be computers that include similar elements as those of computer 20 FIG. 1. In these example embodiments, clients 201-203 can include circuitry configured to effect operating systems and circuitry configured to emulate the functionality of terminals, e.g., a remote desktop client application executed by one or more processors. In these example embodiments one skilled in the art can appreciate that the circuitry configured to effectuate the operating systems can also include the circuitry configured to emulate terminals.

In the depicted example the server 204 can be configured to generate one or more sessions for connecting clients 201, 202, and 203 such as sessions 1 through N (where N is an integer greater than 1.) Briefly, a session in example embodiments of the present disclosure can generally include an operational environment that is effectuated by a plurality of subsystems, e.g., executing processes, that effectuate an execution environment and interact with a kernel 218 an operating system 214. For example, a session can include a shell and a user interface such as a desktop, the subsystems that track mouse movement within the desktop, the subsystems that translate a mouse click on an icon into commands that effectuate an instance of a program, etc. In another example embodiment the session can include an application. In this example while an application is rendered a desktop environment may still be generated and hidden from the user.

The session in this example can include similar subsystems as the session described above. Generally, a session can be generated by the server 204 on a user by user basis when, for example, the server 204 receives a connection request over a network connection from a client such as client 201. Generally, a connection request can first be handled by the transport stack 210 that can, for example, be effectuated by circuitry of the server 204. The transport stack 210 can in some embodiments include a network adaptor, firmware, and/or software that can be configured to listen for connection messages on a certain port and forward them to the engine 212. As illustrated by FIG. 2, when sessions are generated the transport logic 210 can instantiate remote desktop protocol stack instances for each session such as stack instance 1 through N. Generally, each remote desktop protocol stack instance can be configured to route server 204 output to an associated client and route client input to a session core 244 for the appropriate session.

As illustrated by FIG. 2, during the session creation process a session manager 216 can be configured to initialize and manage each session by, for example, generating a session identifier for a session space; adding the session identifier to a table; assigning memory to the session space; and generating system environment variables and instances of subsystem processes in memory assigned to the session space. As illustrated by FIG. 2, in an embodiment the session manager 216 can instantiate environment subsystems such as a runtime subsystem 240 that can include a kernel mode part such as the session core 244. For example, the environment subsystems in an embodiment can expose a subset of services to application programs and provide an access point to the kernel 218 of the operating system 214. As illustrated by FIG. 2, in some embodiments the kernel 218 can include a security subsystem 250 and a resource manager 256. In an example embodiment the security subsystem 250 can enforce security policies of the server 204 by, for example, performing run-time object protection. In these embodiments the resource manager 256 can create and terminate processes and threads in response to requests from the runtime subsystem 240. More specifically, in an embodiment the runtime subsystem 240 can request the execution of threads and the session core 244 can send requests to the executive of the kernel 218 to allocate memory for the threads and schedule time for them to be executed.

Continuing with the description of FIG. 2, in an embodiment the session core 244 can include a graphics display interface 246 (GDI) and an input subsystem 252. The input subsystem 252 can be configured to receive user input from a client 201 via the remote desktop protocol stack instance associated with the session and transmit the input to the session core 244. The user input can in some embodiments include signals indicative of absolute and/or relative mouse movement commands, mouse coordinates, mouse clicks, keyboard signals, joystick movement signals, etc. User input, for example, a mouse double-click on an icon, can be received by the session core 244 and the input subsystem 252 can be configured to determine that an icon is located at the coordinates associated with the double-click. The input subsystem 252 can then be configured to send a notification to the runtime subsystem 240 that can execute a process for the application associated with the icon.

In addition to receiving input from a client 201, draw commands can be received from applications and/or the desktop and processed by the GDI 246. The GDI 246 in general can include a process that can generate graphical object draw commands. The GDI 246 in this example embodiment can be configured to pass the commands to the remote display subsystem 254 that can instantiate a display driver for the session.

In an example embodiment the remote display subsystem 254 can be configured to include virtual display driver(s) that may not be associated with displays physically attached to the server 204, e.g., the server 204 could be running headless. The virtual display driver in this embodiment can be configured to receive the draw commands and transmit them to the client 201 via the remote desktop protocol stack instance associated with the session.

Referring now to FIG. 3, it an example operational environment for practicing aspects of the present disclosure. For example, FIG. 3 depicts a high level overview of a terminal server environment including a terminal server 204 and a client 201. In the depicted example the client 201 and the terminal server 204 can be connected by a channel 300 that can be based on the ICA protocol, the RDP protocol, the X11 protocol, the VNC protocol, or any other suitable presentation-level protocol designed to run over industry standard transport protocols, such as TCP/IP. In example embodiments of the present disclosure the communication channel 300 can be a session-oriented transmission connection that can be used by application-layer code to issue commands for exchanging data. The communication channel 300 can include one or more virtual channels that extend the functionality of communication channel 300. The virtual channels are effectuated by client-side and server-side components that transfer customized data over a, for example, the remote desktop protocol. Examples of functional enhancements that virtual channels offer can include support for special types of hardware, audio, or other additions to the core functionality provided by the terminal services RDP such as printer support, graphics, and virtual device support.

The virtual channels can be configured to support the transfer of data from a data source 302 on the server 204 to a device 320. The data source 302 can be an application configured to generate a data stream such as a stream of audio, video, graphics, print commands, etc., and the data stream can be passed to the appropriate device on the client 201, e.g., speaker, display, application, printer, etc., via the remote protocol stack instance and the underlying transport mechanism. As one skilled in the art can appreciate, while one data source is illustrated multiple data source can generate data streams in other embodiments. Since in the terminal server environment the device 320 is not located at the server 204, a redirection driver 304 can be configured to receive data from the data source 302; format the data stream into a stream useable by the remote protocol stack instance; and send the stream to the stack instance. In a specific example, multiple audio data sources can be serviced by the same redirection audio driver. Continuing with the general description of FIG. 3, the stack instance can include, but is not limited to, an application layer 306, a terminal server layer 308 and an interface layer 310. Generally, the activity involved in sending and receiving data through the stack instance is essentially the same as the seven-layer OSI (open systems interconnection) model standards for common LAN networking today. The application layer 306 can be considered an API or a shell for the stack instance and can receive data from, for example, the redirection driver (s), the remote display subsystem 254, etc. The application layer 306 can receive data from the driver 304, section the data, mark the data as belonging to a specific virtual channel and route the data to the terminal service layer 308. The terminal service layer 308 can be considered the engine for the stack instance and can determine whether to take action on data as it passes through the layer, e.g., determine how to encrypt the data. The terminal server layer 308 can then pass information to the interface layer 310 that is operable to provide a protocol-independent interface to the network protocol layer, e.g., a conventional network transport such as a protocol that conforms to the OSI model.

Packets of data can be transmitted via the channel 300 to the client 201 where the preceding process can be reversed. For example, the interface layer 310 can receive packets and remove the data from the packets and send the information to the terminal server layer 308. The terminal server layer 308 can send the data to the virtual channel dlls 312 and eventually to the appropriate driver 318. The information can be processed by the driver 318 and the device 320 can be used.

Referring now to FIG. 4, it illustrates a stack instance sending and receiving data streams. One skilled in the art can appreciate that in some embodiments the stack instance may only send data or receive data. The data streams in this example can be stream of audio, video, graphics, print commands, or data for a serial device such as a plug and play USB device.

According to example embodiments of the present disclosure a portion of the outgoing data stream can be stored in a buffer 402. In this example the terminal server layer 308 is shown including a history 404 and a buffer 402. History 404 and buffer 402 are depicted in dashed lines which is indicative of the fact that they are considered optionally located within the terminal server layer 308 and in other embodiments the history 404 and/or the buffer 402 can be located within the same or different layers of the stack instance, e.g., buffer 402 could be located within the interface layer 310 and history 404 could be located within the terminal server layer 308. In other non-terminal server implementations such as FTP or SMTP, the buffer 402 and/or the history 404 can be stored in the network protocol layer 412 or any other OSI layer. In other example embodiments the history 404 and/or buffer 402 can be located within the memory assigned to the session space associated with the stack instance and the instructions of the stack instance can be configured to access the address(es) assigned to the history 404 and/or buffer 402. History 404 and/or buffer 402 can in example embodiments include RAM or another type of memory and can be arraigned as a self overwriting memory location, e.g., a ring buffer.

Continuing with the description of FIG. 4, buffer 402 can be configured to store a least a portion of the data stream that was sent via the network to a remote computer, e.g., the client 201 and/or the server 204. The buffer 402 can be configured to identify different portions of data stored in the buffer such as portions 2-5. The size of the portions is configurable based on the implementation and in an embodiment the portion can include a byte of information, however in other example embodiments the portion of data could include a bit, or 1480 bytes, e.g., the maximum payload of an IPv4 packet. Continuing with the description of FIG. 4, the network protocol layer 412 can send the data stream in one or more packets. As illustrated by FIG. 4, in an embodiment the network protocol layer 412 can receive a data stream from a remote computer, e.g., the client 201 or the server 204, in one or more packets.

The following are a series of flowcharts depicting implementations of processes. For ease of understanding, the flowcharts are organized such that the initial flowcharts present implementations via an overall "big picture" viewpoint and subsequent flowcharts provide further additions and/or details. Those having skill in the art will appreciate that the style of presentation utilized herein generally allows for a rapid and easy understanding of the various operational procedures that form a part of the present disclosure.

Figure 5:
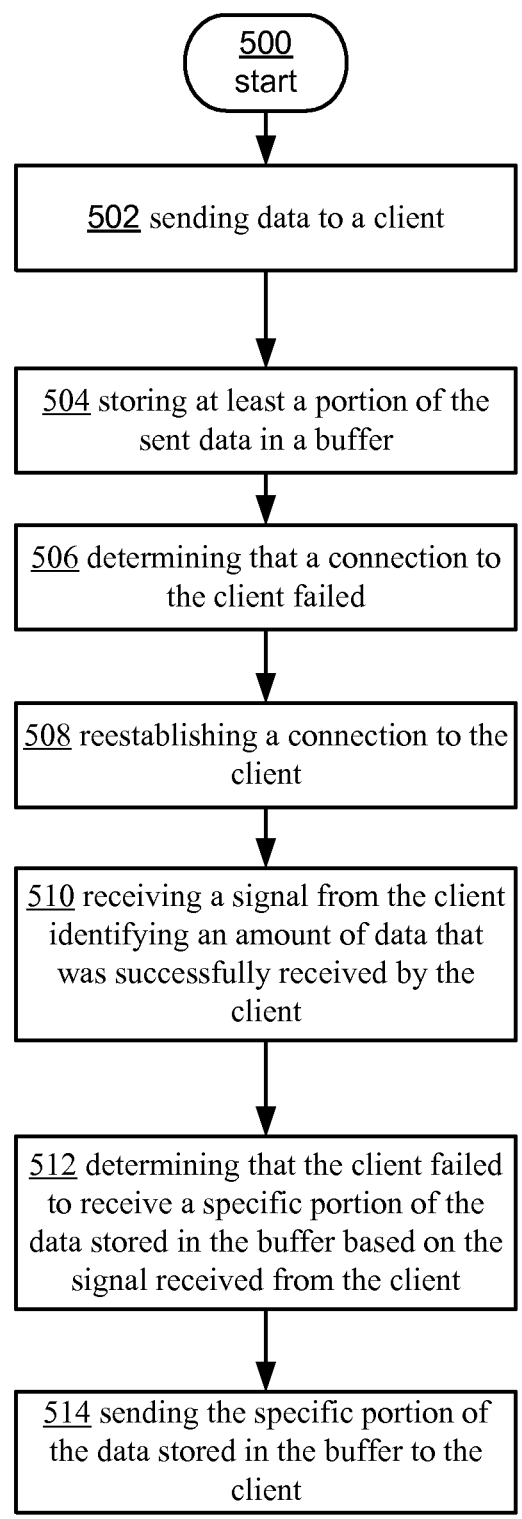
FIG. 5 illustrates an operational procedure for practicing aspects of the present disclosure.

Referring now to FIG. 5, it illustrates an operational procedure including operations 500, 502, 504, 506, 508, 510, 512, and 514. Operation 500 begins the operational procedure and operation 502 illustrates sending data to a client. For example, and referring to FIG. 4 in conjunction with FIG. 2, a network adaptor of a server 204 can be configured to send data to a client 201 via a network connection. In an example embodiment the data can be sent over a virtual channel of a remote desktop protocol that is established over a TCP/IP connection. The data source, e.g., a videogame stream of data indicative of vector based graphics (lines and shapes that can be rendered by a video card) can be sent from the game to a display driver, in this example driver redirection driver 304. Typically a redirection driver 304 communicates with a hardware component of the computer system. The redirection driver 304 acts as a translator between the hardware component and the data source that uses it. In this example the redirection driver 304 can be configured to route render commands to the client 201 via a virtual channel over a remote desktop protocol. Once the redirection driver 304 formats the data stream received from the data source 302, it can send the data to the client 201 via the stack instance for the session.

Operation 504 shows storing at least a portion of the sent data in a buffer. For example, and referring to FIG. 4, in an embodiment a process of the stack instance can configure a processor to store at least a portion of the data sent over the communication channel in buffer 402. A portion of the data may be stored in embodiments and in the depicted example portions 1-5 have been sent from the source of the data and a portion of the sent data, e.g., portions 2-5, have been stored in buffer 402. While FIG. 4 shows that only a portion of the data is stored in buffer 402, one skilled in the art can appreciate that in other embodiments all the sent data can be stored in the buffer 402 provided that the buffer 402 is large enough.

Continuing with the description of operation 504, the processor can be configured by code of the transport stack to store the portion of the data stream in buffer 402 in response to receiving a signal that indicates that the portion was successfully sent to the client 201. For example, network protocol layer 412 can be configured to report the successful transmission of each packet and a process of the stack instance can be configured to identify which portion was sent in the packet and store a copy of data in the buffer 402. In a specific example each portion can be a byte of information. The terminal server layer 308 can send portion 2, e.g., a byte, to the network protocol layer 412 via the network layer 310 that can place the data in at least one packet (along with other data from other data sources for example) and send the data out. When the data is sent, a signal can be transmitted to the terminal server layer 308 indicating that portion 2 was transmitted and a copy of the byte can be stored in buffer 402.

Continuing with the description of FIG. 5, operation 506 shows determining that a connection to the client failed. For example, the network protocol layer 412 of FIG. 4 can be configured to determine that a network connection to the client 201 failed. In embodiments using TCP/IP, the successful transmission of a packet of information can be acknowledged by the client 201 and if a packet is sent without receiving such an acknowledgment the network protocol layer 412 can be configured to determine that the connection closed. This information can be propagated to the terminal server layer 308 for example and stored in the history 404.

Continuing with the description of FIG. 5, operation 508 shows reestablishing a connection to the client. For example, and similar to that described above with respect to FIG. 2, the transport stack 210 of the server 204 can receive a connection request from the client 201. The connection request can include a session identifier that can be used by the server 204 to determine that a session already exists.

Continuing with the description of FIG. 5, operation 510 illustrates receiving a signal from the client identifying an amount of data that was successfully received by the client. For example, an in addition to the previous example server 204 can be configured to receive a signal from the client 201 indicating an amount of data that it had received prior to the connection failure and the amount of received data can be used to determine whether data needs to be resent. In embodiments that use TCP/IP the amount of data received can be used to determine whether data needs to be resent because TCP/IP is a reliable protocol up until a failure, e.g., TCP/IP guarantees that each packet sent will be received in the order in which it was sent unless there is a channel failure. Since the failure can occur while one or more packets are en route the originator can not be sure what was actually received by the recipient in a failure situation. In this example the client 201 can send a signal to the server 204 indicating that it received a specific amount of data from the server 204, e.g., server 204 could have sent 5 portions of a data stream and the client 201 may have only received 2 portions.

Continuing with the description of FIG. 5, operation 512 illustrates determining that the client failed to receive a specific portion of the data stored in the buffer based on the signal received from the client. For example, and in addition to the previous example a process of the stack instance can configure a processor of the server 204 to process the information that identifies the amount of data successfully received by the client 201 to determine that the client 201 failed to receive a specific portion of the data stored in the buffer 402 of FIG. 4. Continuing from the example above, a processor of the server 204 can determine that the last 3 bytes of information, e.g., bytes 3-5 were not received by the client 201. In another specific example the buffer 402 can include the last million bytes of information sent to the client 201. The signal could in this example indicate that the client 201 received 999,900 bytes of information. In this example, a process of the stack instance can include code that when processed by a processor determines that the client 201 failed to receive the last 100 bytes of information that were sent to the client 201.

Continuing with the description of FIG. 5, operation 514 illustrates sending the specific portion of the data stored in the buffer to the client. For example, and in addition to the previous example the processor can be configured by code of the stack instance to resend the specific portion of the data stored in the buffer 204 to the client 201. Continuing the specific example from above, the terminal server layer can be configured to copy the last 100 bytes from the buffer 402 and send the data to the client 201.

Figure 6:
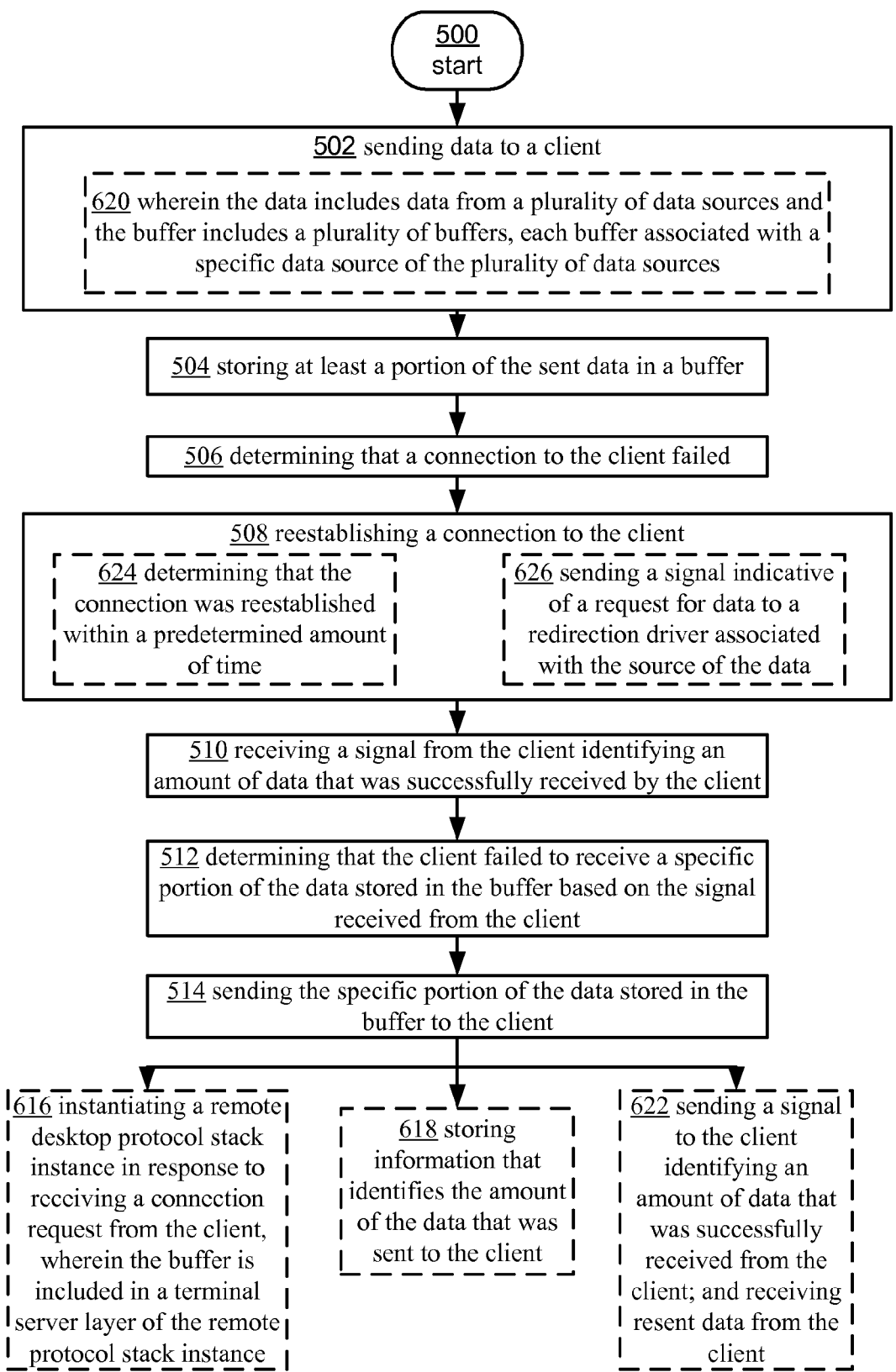
FIG. 6 illustrates an alternative embodiment of the operational procedure 500 of FIG. 5.

Referring now to FIG. 6, it illustrates an alternative embodiment of the operational procedure 500 of FIG. 5 including additional details and refinements. As is illustrated by FIG. 6, operation 616 shows instantiating a remote desktop protocol stack instance in response to receiving a connection request from the client, wherein the buffer is included in a terminal server layer of the remote protocol stack instance. For example, and referring to FIGS. 2 and 3, prior to exchanging data the server 204 and client 201 can establish a channel such as channel 300 of FIG. 3. The channel initialization procedure can begin when, for example, a client 201 transmits a connection request to a server 204 via a packet based network. As shown by FIG. 2, transport stack 210 of server 204 can receive the request and forward the information to engine 212. The session manager 216 can instantiate a session for the client 201 and instantiate a remote desktop protocol stack instance to service the session. The remote desktop protocol stack instance can be configured to transmit a connection grant signal to client 201. The client 201 in this example can then be configured to transmit initialization information to the server 204 in order to configure at least one server side virtual device such as a virtual printer driver, virtual audio driver, virtual video driver, and/or a virtual plug and play device. In this example the client 201 can send information that identifies each device coupled to the client 201 to the server 204. The server 204 can be configured to receive the information and the server 204 can instantiate one or more redirection drivers to support the client devices and virtual channels to route data for the virtual devices to devices operating on the client 201.

In a specific example the configuration information can include a specific screen resolution. A virtual display driver can be loaded by the server 204 that includes the desired display resolution. The virtual display driver can be configured to receive draw commands from the GDI 246 and send them across the network to the client 201 where a client side component can receive the information and convert it into information that can be processed by the display driver of the client 201. In another specific example the connection request can indicate that a specific type of printer is coupled to the client 201. The server 204 can instantiate a printer redirection driver that emulates the presence of the specific type of printer on the server 204. Print commands from the server 204 can be received by the printer redirection driver and routed to the client 201 where a client side component can receive the information and convert it into information that can be processed by the printer driver of the client 201.

Continuing with the description of FIG. 6, operation 618 shows storing information that identifies the amount of the data that was sent to the client. For example, and referring to FIG. 4, in an example embodiment the server 204 can store information that identifies the amount of data that was sent to the client 201 in a history 404, e.g., a memory location accessible to a process of the stack instance. The information can, for example, include the number of bytes sent by the server 204 during a session to the client 201. The history 404 can be a data structure stored in memory that has a counter that can be incremented each time a portion of data is sent via one or more packets to the client 201, e.g., when byte 1 associated with the session is sent, or byte one associated with a specific data source is sent, the counter can be incremented by 1.

Continuing with the description of FIG. 6, operation 620 shows the operational procedure of FIG. 5, wherein the data includes data from a plurality of data sources and the buffer includes a plurality of buffers, each buffer associated with a specific data source of the plurality of data sources. For example, in an embodiment of the present disclosure the data can comprise data generated by a plurality of data sources. In this example embodiment the server 204 can include multiple data sources and the server 204 can include one or more redirection drivers. In this example each redirection driver can support one or more data sources, e.g., a redirection audio driver could process audio data streams from a mp3 player and a video player that are executing at the same time. In this example the terminal server layer 308 can comprise multiple buffers such as buffer 402 and each data source can be associated with its own buffer in the stack instance for the session, i.e., at least a portion of a data stream associated with the mp3 player can be stored in a first buffer and at least a portion of the data stream associated with the video player can be stored in a second buffer.

In this example each data stream could be sent over its own virtual channel and the client 201, e.g., terminal server layer 308 and/or the virtual channel dlls can track how much data was received for each data source. In the event that the virtual channels fail and a reconnection process is initiated by the client 201, the server 204 could receive information that identifies the amount of each data stream that was received from the client 201. That is, the virtual channel dlls can each report how much data they received to the server 204, e.g., a virtual channel dll associated with mp3 player can send information indicative of how much data it received prior to the connection failure and the dll associated with the video player can do the same. In this example a processor of the server 204, e.g., a core of a CPU or a microprocessor of a network adaptor, can execute code of the stack instance and compare the amount of data that was received for each data stream to the amount of data that was actually sent to the client 201 in order to determine which portion of each data stream needs to be sent again. In this example the processor of the server 204 can then be configured by code of the stack instance to retransmit the portions of the data streams to the client 201 using techniques similar to that described above.

Continuing with the description of FIG. 6, operation 622 shows sending a signal to the client identifying an amount of data that was successfully received from the client; and receiving resent data from the client. For example, in an embodiment of the present disclosure the server 204 can receive retransmitted data from the client 201 similar to how the client 201 receives retransmitted data from the server 204. In this example, and referring to FIG. 4, history 404 can record the amount of data that was received from the client 201, e.g., the portion of a file that successfully copied from the client desktop to the session desktop. In the instance that a connection to the client 201 is lost and reestablished, the server 204 can read the value stored in history 404 and transmit the information to the client 201 in, for example, a connection grant acknowledgment signal. In this example the server 204 can receive portions of a data stream resent by the client 201, e.g., the portion of the file that was sent by the client 201 but not received by the server 204.

Referring now to operation 624, it illustrates the operational procedure 508 of FIG. 6 wherein reestablishing the connection to the client further comprises determining that the connection was reestablished within a predetermined amount of time. In at least one embodiment of the present disclosure the server 204 can determine that a connection was reestablished with the client 201 within a predetermined amount of time, e.g., within 5 minutes. Generally, in the instance that the connection fails the failure is propagated from the stack instance to the session manager 216 that in turn terminates the redirection drivers and stores the state of the session in persistent storage. Instead of terminating the session, in this example the stack instance can be configured to delay propagating a disconnect signal to the higher level layers of the terminal server session for a predetermined period of time. If, for example, the predetermined time period elapses and a connection request is not received the stack instance can report the connection failure to the session manager 216. In this example embodiment by delaying the propagation of a disconnect signal the terminal server session can continue to exist for the predetermined time period while the client 201 (hopefully) attempts to reestablish connection. When the client 201 reconnects the server 204 can receive information that identifies how much data was lost en route to the client 201 and start to transmit data from buffer 402 while the redirection drivers 304 are reinitializing.

Referring now to operation 626, it illustrates the operational procedure 508 of FIG. 5 wherein reestablishing the connection to the client further comprises sending a signal indicative of a request for data to a redirection driver associated with the source of the data. For example, in an embodiment of the present disclosure the redirection driver 304 can include a cache used for storing processed data received from the data source. The redirection driver 304 can send data to the application layer 306 when it receives an input/output signal requesting the data from the stack instance. In this example when a channel failure is detected the stack instance can delay sending a data transfer signal to the redirection driver 304. In this example the redirection driver 304 can idle while waiting for a signal from the application layer 306 to request more data. In this example embodiment when a connection is reestablished with the client 201 the application layer 306 can be configured to send a signal to the redirection driver 304 for data. Once the request is received by the redirection driver 304 it can send data stored in its cache.

Figure 7:
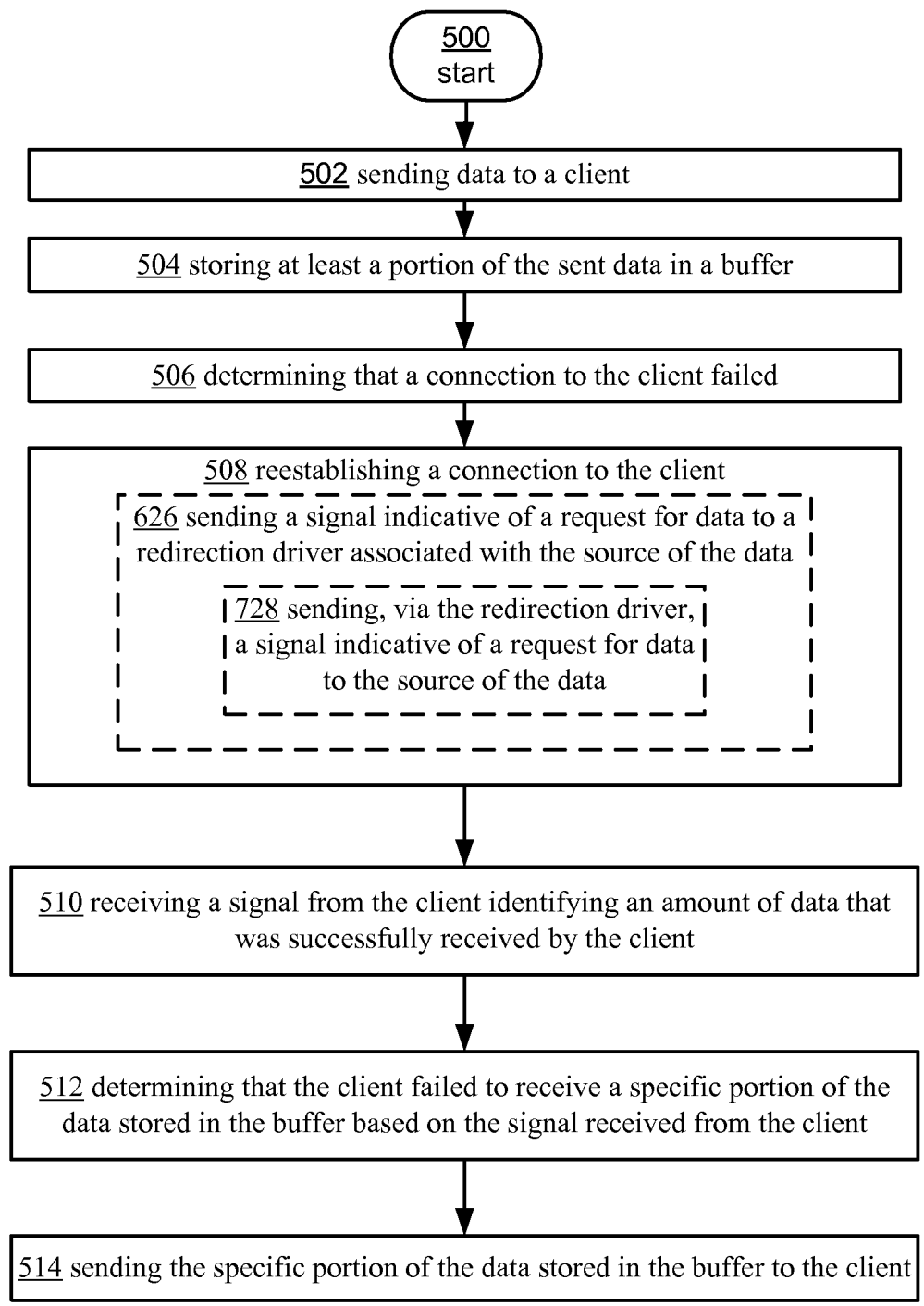
FIG. 7 illustrates an alternative embodiment of the operational procedure 500 of FIG. 6.

Referring now to operation 728 of FIG. 7, it illustrates an alternative embodiment of the operational procedure of FIG. 6 wherein reestablishing the connection to the client further comprises sending, via the redirection driver, a signal indicative of a request for data to the source of the data. Similar to that described above in this example the data source 302 can include a cache used for storing a part of the data stream prior to sending it to the redirection driver 304. In this example when the redirection driver 304 idles, e.g., when the redirection driver 304 is waiting for a I/O signal from the stack instance, the data source can also idle. When a connection is reestablished with the client 201 the application layer 306 can be configured to send a signal to the redirection driver 304 for data. Once the request is received by the redirection driver 304 it can be configured to send data stored its cache and send an I/O request to the data source 302 requesting the data stored in the data source's cache. Typically, a device driver waits for a confirmation signal from the transport stack prior to sending more data thus, when the confirmation signal is delayed the data source can be paused while the stack instance is waiting for the client 201 to reconnect.

Figure 8:
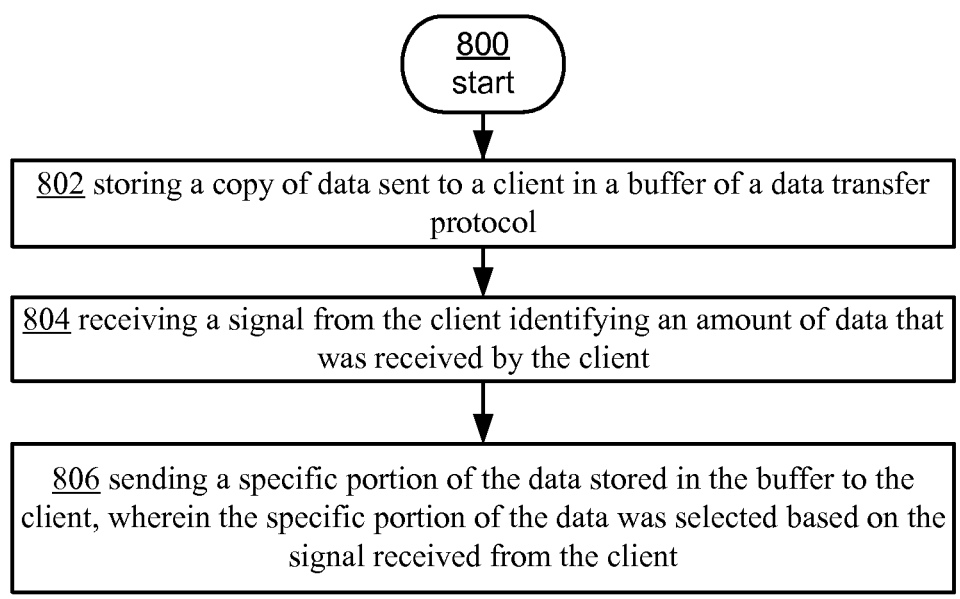
FIG. 8 illustrates an operational procedure for practicing aspects of the present disclosure.

Referring now to FIG. 8 illustrates an operational procedure for practicing aspects of the present disclosure including operations 800, 802, 804, and 806. Operation 800 begins the operational procedure and operation 802 shows storing a copy of data sent to a client in a buffer of a data transfer protocol. For example, in an embodiment of the present disclosure a copy of data successfully sent to a client 201 can be stored in a buffer of a protocol. One example protocol can be the remote desktop protocol stack instance for a session. For example, and referring to FIG. 4, in an embodiment a process of the stack instance can configure a processor to store at least a portion of the data sent over the communication channel can be in memory managed by the stack instance such as buffer 402. A portion of the data may be stored in embodiments and in the depicted example portions 1-5 have been sent from the source of the data and a portion of the sent data, e.g., portions 2-5, have been stored in buffer 402. While FIG. 4 shows that a portion of the data is stored in buffer 402 however one skilled in the art can appreciate that in other embodiments all the sent data can be stored in the buffer 402 provided that the buffer 402 is large enough.

In an alternative embodiment the buffer 402 can be located within the network protocol layer 412. The network protocol layer 412 can include layers similar to the OSI model. In OSI embodiments, the buffer 402 can be located within any layer of the OSI model such as the session layer and/or the transport layer. The session layer establishes and manages end user connections and the transport layer transfers data between users and implements error correction/recovery techniques. In this example the network protocol layer 412 having a buffer can be implemented within a computer system similar to that described by FIG. 1. The computer system can be configured to send data over a network connection conforming to an application layer protocol such as file transfer protocol, the simple mail transfer protocol, and the like. In this example the computer system can include a web-server that allows clients to download data such as movies, songs, documents, etc. When the network protocol layer 412 receives data at least a portion of the data can be stored in the buffer 402 prior to transferring it across the wire.

Continuing with the description of FIG. 8, operation 804 illustrates receiving a signal from the client identifying an amount of data that was received by the client. For example, in an embodiment of the present disclosure a network adaptor of a server 204 or a web server using components similar to computer system 20 of FIG. 1, can receive a signal from a client 201 that identifies the amount of data that was received by the client 201 for example prior to a connection failure. The signal in this example can identify an amount of data that was actually received by the client 201 prior to the dropped connection. In this example a network adaptor can receive a signal that can indicate that 100 kb was received by the client 201. The 100 kb in this example can be a portion of a song that was downloaded. In this example the server 204 or a web server may have sent 150 kb of data for the song however the client 201 may have actually only received 100 kb.

Referring now to operation 806, it illustrates sending a specific portion of the data stored in the buffer to the client, wherein the specific portion of the data was selected based on the signal received from the client. For example, and in addition to the previous example circuitry of the server 204 or a web server, e.g., one or more processors configured by software instructions, can be configured to process the information that identifies the amount of data received by the client 201 to determine which portion(s) of the data stored in the buffer 402 of FIG. 4 the client 201 did not receive. For example, and continuing from the example above, the server can receive a signal indicating that the client 201 received 100 kb of data. The server can be configured to check the buffer 402 to determine how much data was sent. In this example 150 kb of a song may have been sent and the data indicative of the song could have been stored in the buffer 402, i.e., the 50 kb that was sent but was not received. In this example code can be executed by a processor and the processor can determine that the last 50 kb was sent but not received by the client 201. Once the determination is made the 50 kb can be resent.

Figure 9:
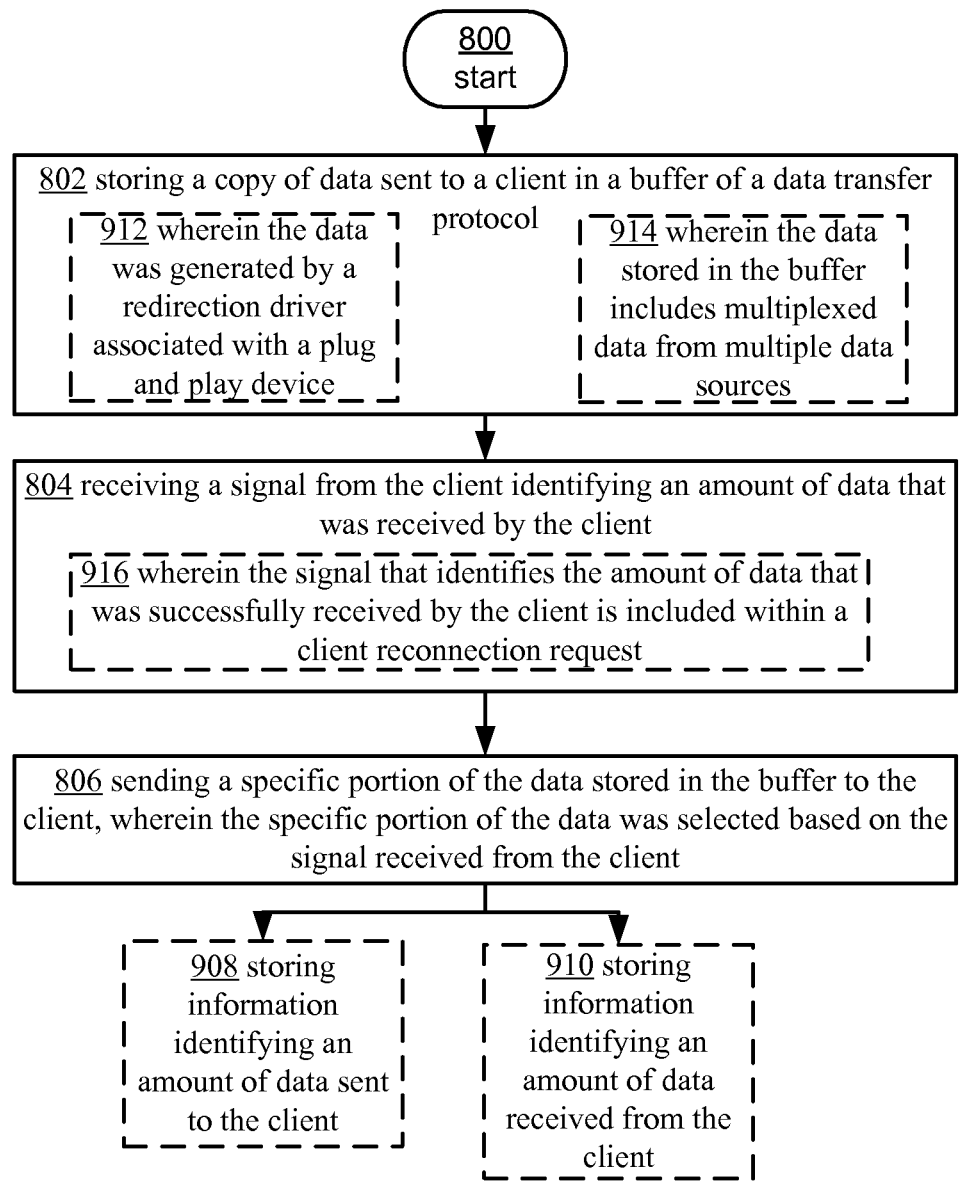
FIG. 9 illustrates an alternative embodiment of the operational procedure 800 of FIG. 8.

Referring now to FIG. 9, it illustrates an alternative embodiment of the operational procedure 800 of FIG. 8 including the additional operations 908, 810, 912, 914, 916, 918, and 920. Referring now to operation 908 it shows storing information identifying an amount of data sent to the client. For example, in an embodiment of the present disclosure a history 404, e.g., an area of memory such as RAM, can be provided and can be configured to increment a number that indicates the amount of data that was sent to the client 201. The incremented number stored in history 404 can reflect the number of bytes sent by the server 204 or web server during a communication session to the client 201. For example, in an embodiment a FTP server may send a song to a client 201 via a FTP communication protocol. While the song is being downloaded a processor can be configured by software to increment the value to reflect that, for example, 1.2 mb of data was downloaded. During the download process communication with the client 201 may be disrupted and the connection may be lost. If the connection is reestablished the client 201 can send a number indicative of the amount of data that was actually received to the server 201. The protocol can be configured to compare the number to the history 404 to determine whether any of the information sent to the client 201 was lost along the way. If for example, data was lost en route, the protocol can be configured to determine whether the lost data is stored in buffer 402 by comparing the number of bytes received to the range of send bytes stored in the buffer 402. In the example that the data is stored in the buffer 402 it can be resent to the client 201 otherwise the protocol can propagate a connection failure message to the application that was sending the data and the transfer of data can be restarted from the beginning.

In a specific terminal server example, the data transfer protocol can comprise a history 404 that is configured to increment a value stored in memory that is indicative of how much data was sent to a terminal server client 201 during, for example, a terminal server session or a specific data transfer operation, e.g., a copy and paste operation from the client desktop to the server desktop environment. In a copy and paste operation for example 1 mb of a 2 mb document may have been copied over from the server 204 to the client 201 prior to a connection failure. In this example the history 404 may include information that identifies that 1 mb was transferred and the buffer 402 may include the last 500 kb of data that was sent to the client 201, e.g., bytes 512,001 to 1,024, 000. When the connection is reestablished the client 201 can send information indicating that it has received 600,000 bytes. In this example the remote desktop protocol can determine that the client 201 has received a portion of the data that was actually sent and that the portion that needs to be resent is stored in the buffer 402. In this example the remote desktop protocol can be configured to resent bytes 600,001 to 1,024, 000.

Continuing with the description of FIG. 9, operation 910 illustrates storing information identifying an amount of data received from the client. For example, in an embodiment the server 204 can be configured to store information identifying how much data was received from a client 201. For example, and referring to FIG. 4, the history 404 can be configured to store the amount of data received from the client 201. The client 201 in this example can send data to the server 204 such as clipboard data, files, and the like. In this example each data source of the client 201 can be associated with its own virtual channel and the history 404 can store information that identifies how much data from each channel was received. For example, a user of the client 201 may cut and paste a document to the desktop of the server 204. The interface layer 310 of the client 201 may place the data in one or more packets and transmit the packets to the server 204. The interface layer 310 of the server 204 can receive the packets and extract the data stream. The terminal server layer 308 can receive the data stream and increment a number stored in the history 404 that reflects the amount of bytes received in the cut and paste operation. The data stream can be passed to the application layer 310 where the data stream can be reformatted into a format acceptable to be processed by the desktop and sent to the desktop of the server 204.

Continuing with the description of FIG. 9, it additionally illustrates operation 912 that shows storing a copy of data sent to the client, wherein the data was generated by a redirection driver associated with a plug and play device. For example, referring to FIG. 4, in at least one embodiment the data stored in the buffer 402 is from an application executing on the server 204 that is associated with a plug and play device such as, but not limited to, a digital camera, a video camera, a hard disk storage device, a digital media recorder, and the like. The server 204 can include a plug and play redirector 258 and one or more redirection drivers. In this example the client 201 can be configured to recognize device 320 and send information to PNP redirector 258, where the information is used to create the redirection driver 304. The redirection driver 304 is instantiated and a communication channel is established with the client 201. The data source 302 is notified of the newly discovered device 320 and the real device driver 318 can be instantiated.

Continuing with the description of FIG. 9, it additionally illustrates operation 914 that shows storing a copy of data sent to the client wherein the data stored in the buffer includes multiplexed data from multiple data sources. For example, in an embodiment of the disclosure the data stored in the buffer 402 comprises of data from a plurality of data sources that are multiplexed into a single data stream prior to transmission by the network protocol layer 412. In an example the data from a plurality of redirection drivers is received by the stack instance and combined by a multiplexer. At least a portion of the multiplexed data stream that is successfully sent to the client 201 is then stored in the buffer 402. The client signal identifying the amount of data that was received by the client 201 can then be used to determine whether the client 201 needs a portion of the multiplexed data stream stored in the buffer resent.

Continuing with the description of FIG. 9, operation 916 illustrates receiving the signal from the client, wherein the signal that identifies the amount of data that was successfully received by the client is included within a client reconnection request. For example, in an embodiment of the present disclosure the reconnection request signal received from the client 201 can include the information that identifies the amount of data that it has received. In this example the client 201 can send a connection request to the server 204 that includes a session identifier that was associated with the session that had the failed connection. The server 204 can receive the signal and send the connection request to the correct stack instance. The stack instance for the session can then parse the connection request to identify the amount of data that was previously received by the server 204.

Figure 10:
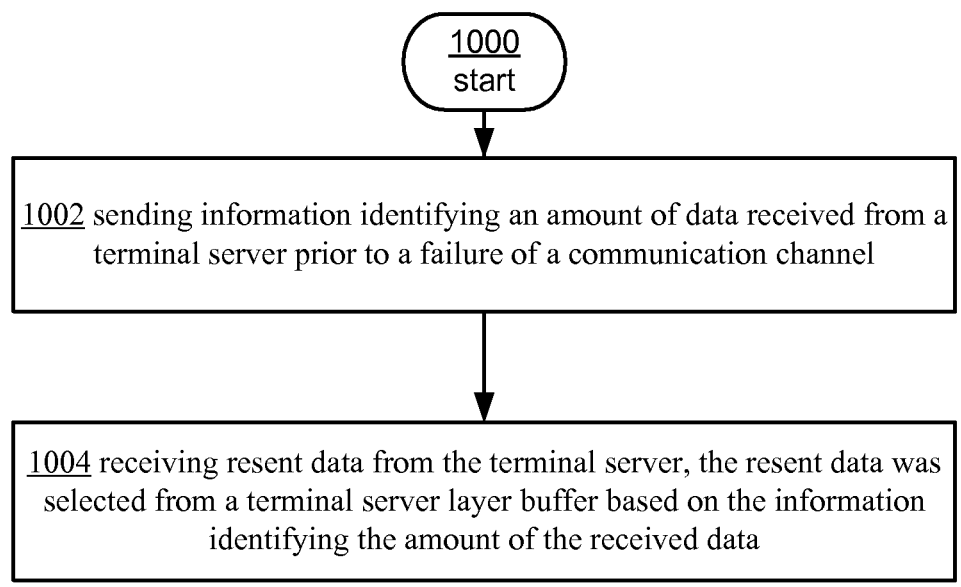
FIG. 10 illustrates an example operational procedure for practicing aspects of the present disclosure.

Referring now to FIG. 10, it illustrates an example operational procedure for practicing aspects of the present disclosure including operations 1000, 1002, and 1004. Operation 1000 begins the operational procedure and operation 1002 shows sending information identifying an amount of data received from a terminal server prior to a failure of a communication channel. For example, and referring to FIG. 4, in an embodiment of the present disclosure the client 201 can include a stack instance having a history 404 optionally located within the terminal server layer 308. In this example the history 404 can store information that identifies how much data was received from a terminal server 204. In this example the amount of data that was received prior to failure of the communication channel established between the client 201 and server 204 can be sent to the terminal server in, for example, a reconnection request.

Continuing with the description of FIG. 10, operation 1004 illustrates receiving resent data from the terminal server, the resent data was selected from a terminal server layer buffer based on the information identifying the amount of the received data. For example, after the client 201 sends the signal to the terminal server it can receive the resent portion of the data based on the amount of data that was received by the client 201. The server 204 may have sent the data stream via a transmission protocol such as TCP/IP, however the client 201 may not have received the data, e.g., the communication channel may have failed while the packets carrying the information were en route to the client 201. In this example the client 201 can send a signal that identifies the bytes that it successfully received to the server 204 and the server can determine whether to resend a specific portion of the previously sent data stream. In this example the underlying transmission protocol can be reliable, e.g., there is a guarantee that each packet sent will be received in the order in which it was sent, the server can easily determine the point in the data stream where the connection was lost and resend the data after the point.

Figure 11:
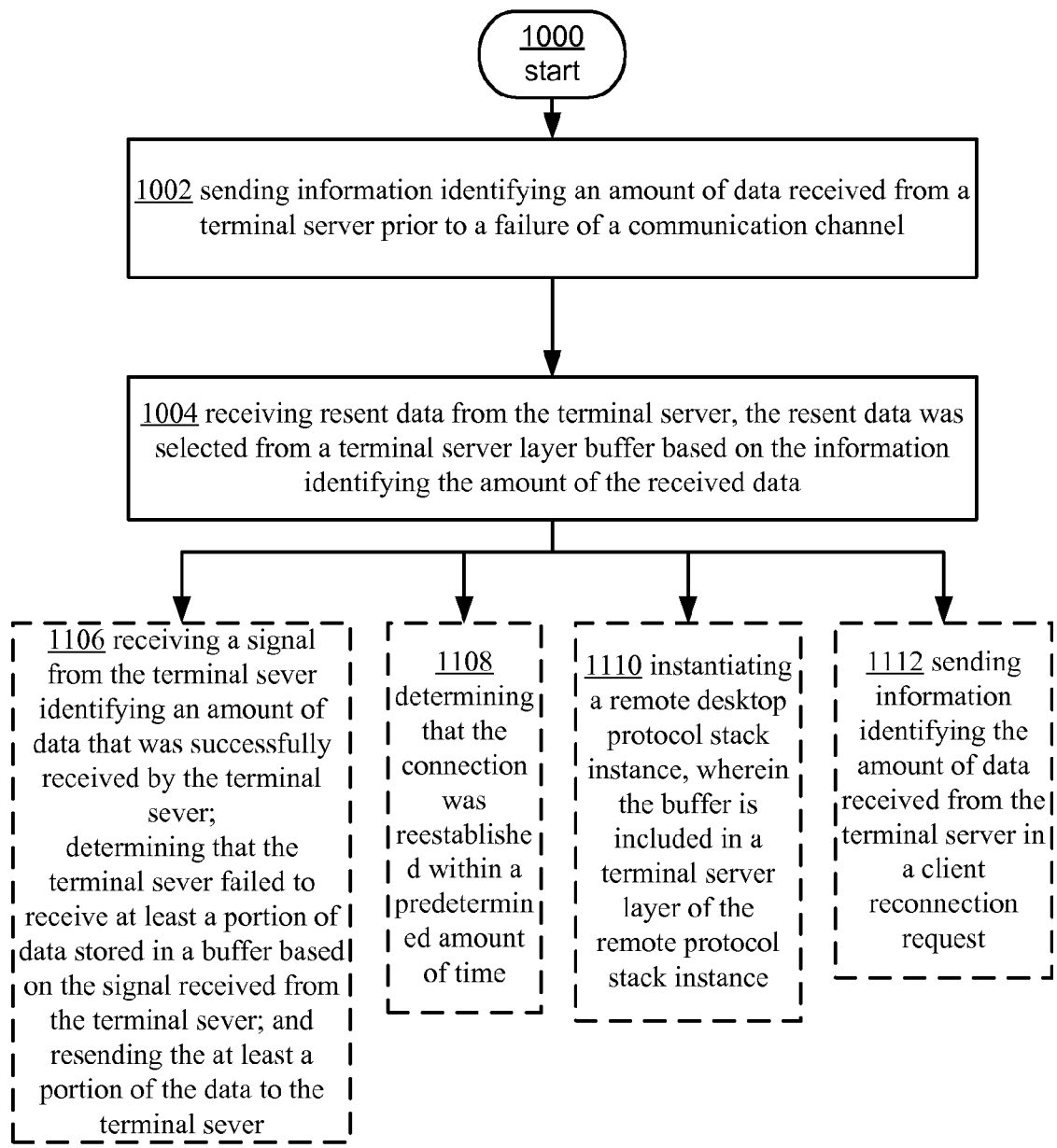
FIG. 11 it illustrates an alternative embodiment to the operational procedure of FIG. 10.

Referring now to FIG. 11, it illustrates an alternative embodiment to the operational procedure of FIG. 12 including the additional operations 1106, 1108, 1110, 1112, and 1114. Referring now to operation 1106, it illustrates receiving a signal from the terminal sever identifying an amount of data that was successfully received by the terminal sever; determining that the terminal sever failed to receive at least a portion of data stored in a buffer based on the signal received from the terminal sever; and resending the at least a portion of the data to the terminal sever. For example, in this embodiment the client 201 can be configured to include a buffer 402 of FIG. 4 and the buffer can be operable to store at least a portion of the data sent to the server 204. In an embodiment the buffer 402 can be a part of the remote desktop protocol stack instance for a session including a terminal server layer 308, and an interface layer 310. The buffer 402 is depicted in this example as a part of the terminal server layer 308 however the buffer 402 can be located elsewhere within the stack instance in other embodiments. In this example the interface layer 310 can provide a protocol-independent interface to the network protocol layer 412, e.g., a conventional network transport such as a protocol that conforms to the OSI model. The network protocol layer 412 can transmit data in packets and report whether the packets are successfully transmitted to the interface layer 310. The interface layer 310 can be configured in this example to send a signal to the terminal server layer 308 indicating that data was successfully sent and the terminal server layer 308 can store a copy of the sent data in the buffer 402.

The client 201 in this example can receive a signal from the terminal server 204 identifying the amount of data it successfully received and circuitry of the client 201, e.g., one or more processors configured by software instructions that effectuate the stack instance, can be configured to process the information that identifies the amount of data received by the server to determine which portion(s) of the data stored in the buffer 402 of FIG. 4 the server 204 did not receive.

Continuing with the description of FIG. 11, operation 1108 shows determining that the connection was reestablished within a predetermined amount of time. In at least one embodiment of the present disclosure the server 204 can determine that a connection was reestablished with the client 201 within a predetermined amount of time, e.g., within 5 minutes. Generally, in the instance that the connection fails the failure is propagated from the stack instance to the session manager 216 that in turn terminates the redirection drivers. Instead of terminating the session, in this example the stack instance can be configured to delay propagating a disconnect signal to the higher level layers of the terminal server session for a predetermined period of time. If, for example, the predetermined time period elapses and a connection request is not received the stack instance can report the connection failure to the session manager 216. In this example embodiment by delaying the propagation of a disconnect signal the terminal server session can continue to exist for the predetermined time period while the client 201 (hopefully) attempts to reestablish connection. When the client 201 reconnects the server 204 can receive information that identifies how much data was lost en route to the client 201 and start to transmit data from buffer 402 while the redirection drivers 304 are reinitializing.

Continuing with the description of FIG. 11, operation 1110 shows instantiating a remote desktop protocol stack instance, wherein the buffer is included in a terminal server layer of the remote protocol stack instance. For example, and referring to FIGS. 2 and 3, prior to exchanging data the server 204 and client 201 can establish a channel such as channel 300 of FIG. 3. The channel initialization procedure can begin when, for example, a client 201 transmits a connection request to a server 204 via a packet based network. As shown by FIG. 2, transport stack 210 of server 204 can receive the request and forward the information to engine 212. The session manager 216 can instantiate a session for the client 201 and instantiate a remote desktop protocol stack instance to service the session. The remote desktop protocol stack instance can be configured to transmit a connection grant signal to client 201. The client 201 in this example can then be configured to transmit initialization information to the server 204 in order to configure at least one server side virtual device such as a virtual printer driver, virtual audio driver, virtual video driver, and/or a virtual plug and play device. For example, the client 201 can include a display that has a certain resolution. In this example the client 201 can send a preferred resolution for the session to the server 204. In another example the client 201 can include a printer of a certain type or one or more USB devices operatively coupled to the client 201 such as digital cameras, mp3. players, etc. In this example the client 201 can send information that identifies each device coupled to the client 201 to the server 204. The server 204 can be configured to receive the information and the server 204 can instantiate one or more redirection drivers to support the client devices and virtual channels to route data for the virtual devices to devices operating on the client 201.

Continuing with the description of FIG. 11, operation 1112 shows sending information identifying the amount of data received from the terminal server in a client reconnection request. For example, in an embodiment of the present disclosure the reconnection request signal sent from the client 201 can include the information that identifies the amount of data that it has received. In this example the client 201 can send a connection request to the server 204 that includes a session identifier that was associated with the previous session. The server 204 can receive the signal and send the connection request to the correct stack instance. The stack instance for the session can then parse the connection request to identify the amount of data that was previously received by the server 204.

The foregoing detailed description has set forth various embodiments of the systems and/or processes via examples and/or operational diagrams. Insofar as such block diagrams, and/or examples contain one or more functions and/or operations, it will be understood by those within the art that each function and/or operation within such block diagrams, or examples can be implemented, individually and/or collectively, by a wide range of hardware, software, firmware, or virtually any combination thereof.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

What is claimed:
1. A terminal server method comprising:
sending data to a client using a network protocol;
storing at least a portion of the sent data in a buffer wherein the buffer stores the data in a format different from the format used in the network protocol;
determining that a connection to the client failed;
reestablishing a connection to the client;
receiving a signal from the client identifying an amount of data that was successfully received by the client;
determining that the client failed to receive a specific portion of the data stored in the buffer based on the signal received from the client; and
sending the specific portion of the data stored in the buffer to the client.

2. The method of claim 1, further comprising:
instantiating a remote desktop protocol stack instance in response to receiving a connection request from the client, wherein the buffer is included in a terminal server layer of the remote protocol stack instance.

3. The method of claim 1, further comprising:
storing information that identifies the amount of the data that was sent to the client.

4. The method of claim 1, wherein the data includes data from a plurality of data sources and the buffer includes a plurality of buffers, each buffer associated with a specific data source of the plurality of data sources.

5. The method of claim 1, further comprising:
sending a signal to the client identifying an amount of data that was successfully received from the client; and
receiving resent data from the client.

6. The method of claim 1, wherein reestablishing the connection to the client further comprises:
determining that the connection was reestablished within a predetermined amount of time.

7. The method of claim 1, wherein reestablishing the connection to the client further comprises:
sending a signal indicative of a request for data to a redirection driver associated with the source of the data.

8. The method of claim 7, wherein reestablishing the connection to the client further comprises:
sending, via the redirection driver, a signal indicative of a request for data to the source of the data.

9. A computer-readable storage device comprising instructions stored thereon that upon execution by a processor cause a terminal server to:
send data to a terminal server client using a network protocol;
store a copy of the data that was sent to the terminal server client in a buffer after removing the data from the format used by the network protocol;
determine that a channel established between the terminal server and the terminal server client failed based on a determination that a predetermined amount of time since a packet was last received from the terminal server client has elapsed;
receive in a reconnection request information from the terminal server client identifying an amount of the data that was successfully received by the client; and
sending a specific portion of the data stored in the buffer to the client, the specific portion of the data selected based on the information identifying the amount of the data that was successfully received by the terminal server client.

10. A computer-readable storage device of claim 9, further comprising instructions stored thereon that upon execution by the processor cause the terminal server to:
store information identifying an amount of data that was sent to the client.

11. A computer-readable storage device of claim 9, further comprising instructions stored thereon that upon execution by the processor cause the terminal server to:
   store information identifying an amount of data that was received from the client.

12. A computer-readable storage device of claim 9, further comprising instructions stored thereon that upon execution by the processor cause the terminal server to:
   generate, by a redirection driver associated with a plug and play device, the data.

13. A computer-readable storage device of claim 9, further comprising instructions stored thereon that upon execution by the processor cause the terminal server to:
   store the data stored in the buffer, the buffer including multiplexed data from multiple data sources.

14. A client device comprising:
   a processor; and
   a memory, the memory being in communication with the processor when powered, the memory including instructions stored thereon that upon execution cause the client device to:
      store information identifying an amount data that was received from a computer system over a network channel established between the client device and the computer system, the amount of data being a portion of the total amount of data that was sent by the computer system to the client device;
      determine that the network channel failed;
      send information identifying the amount of data that was received from the computer system where the amount may vary; and
      receive a second portion of the total amount of data from the computer system, the second portion including a least a part of the total amount of data that was lost en route to the client device.

15. The client device of claim 14, the memory further comprising instructions stored thereon that upon execution cause the client device to:
   receive a signal from the computer system identifying an amount of data sent by the client device that was successfully received by the terminal sever;
   determine that the computer system failed to receive at least a portion of data stored in a buffer based on the signal received from the computer system; and
   resend at least the portion of the data to the computer system.

16. The client device of claim 15, the memory further comprising instructions stored thereon that upon execution cause the client device to:
   instantiate a remote desktop protocol stack instance, wherein the buffer is included in a terminal server layer of the remote protocol stack instance.

17. The client device of claim 14, the memory further comprising instructions stored thereon that upon execution cause the client device to:
   store information that identifies an amount of data that was sent to the computer system.

18. The client device of claim 14, the memory further comprising instructions stored thereon that upon execution cause the client device to:
   determine that a network channel was reestablished within a predetermined amount of time.

19. The client device of claim 14, the instructions that cause the client device to send the information identifying the amount of data that was received from the computer system further comprise instructions that upon execution cause the client device to:
   send information identifying the amount of data received from the computer system in a client reconnection request.

* * * * *